US 12,531,419 B2

(12) United States Patent
Pizarek et al.

(10) Patent No.: US 12,531,419 B2
(45) Date of Patent: Jan. 20, 2026

(54) MOBILE RECTIFIER RESPONSE UNIT

(71) Applicant: AT&T Intellectual Property I, L.P., Atlanta, GA (US)

(72) Inventors: Ellery G. Pizarek, Highland, MI (US); Robert Hammer, Jr., Otsego, MI (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 110 days.

(21) Appl. No.: 18/081,653

(22) Filed: Dec. 14, 2022

(65) Prior Publication Data
US 2024/0204529 A1 Jun. 20, 2024

(51) Int. Cl.
| | |
|---|---|
| H02J 3/38 | (2006.01) |
| H02J 7/00 | (2006.01) |
| H02J 7/02 | (2016.01) |

(52) U.S. Cl.
CPC .............. *H02J 3/38* (2013.01); *H02J 7/0013* (2013.01); *H02J 7/02* (2013.01); *H02J 2207/20* (2020.01)

(58) Field of Classification Search
CPC .... H02J 3/38; H02J 7/0013; H02J 7/02; H02J 2207/20; H02J 9/00; H02J 9/04; H02J 1/10; H02J 1/102; H02M 7/12
See application file for complete search history.

(56) References Cited

U.S. PATENT DOCUMENTS

| | | | | |
|---|---|---|---|---|
| 4,451,773 | A * | 5/1984 | Papathomas | H04M 19/00 363/69 |
| 6,278,200 | B1 * | 8/2001 | Daniel | H02J 3/0073 307/31 |
| 2003/0052543 | A1 * | 3/2003 | Boost | H02M 7/003 307/42 |
| 2008/0103993 | A1 * | 5/2008 | Wilson | G06Q 50/06 705/412 |

OTHER PUBLICATIONS

"Product Showcase: Mobile DC Power System from HM Cragg." Youtube, uploaded by HM Cragg, Apr. 7, 2020, https://www.youtube.com/watch?v=E3ewkePBMk0 (Year: 2020).*
UNIPOWER Products, "Mobile 48VDC Power Pant frm Standby PowerSystem Consultants incorporates UNIPOWER products", downloaded from https://unipowerco.com/mobile-48vdc-power-plant/ on Nov. 27, 2022, 3 pages.
Standby Power Consultants, "The Mobile DC Power System", brochure downloaded from https://www.standbypowersys.com/wp-content/uploads/2020/07/PortableDCPowerSystem-Brochure.pdf on Nov. 27, 2022, 2 pages.

* cited by examiner

*Primary Examiner* — Rexford N Barnie
*Assistant Examiner* — Rasem Mourad

(57) ABSTRACT

An apparatus may include a chassis, at least two wheels, and an equipment enclosure that includes an alternating current power source input, at least one direct current output bus, a plurality of rectifiers having an output capacity exceeding 800 amperes, where the plurality of rectifiers is coupled to the alternating current power source input and the at least (Continued)

one direct current output bus, and a plurality of electrical cables for connecting to the at least one direct current output bus, where a total length of the plurality of electrical cables exceeds 800 feet.

9 Claims, 5 Drawing Sheets

MOBILE RECTIFIER RESPONSE UNIT

The present disclosure relates generally to direct current power plant operations, such as for telecommunication network central office equipment operations, and more particularly to mobile rectifier response units and methods of use for such mobile rectifier response units.

BACKGROUND

Well maintained direct current (DC) power plants with large battery arrays are used for maintaining operation of communication network equipment as well as in other fields, such as utilities, manufacturing, and so forth. Typically, one or more rectifiers are used, which take alternating current (AC) inputs and provide DC outputs to charge the batteries and to power various electrical equipment. However, there are many situations that can compromise the AC power source (e.g., storms, floods, and so forth) that would make it unusable. In addition, rectifiers may be stolen, damaged, or otherwise become unusable. For example, in many instances, a DC power plant may be in a basement or ground floor of a building that is flooded, and the rectifiers can fail.

SUMMARY

In one example, the present disclosure describes an apparatus, e.g., a rectifier response unit that may include a chassis, at least two wheels, and an equipment enclosure that includes an alternating current power source input, at least one direct current output bus, a plurality of rectifiers having an output capacity exceeding 800 amperes, where the plurality of rectifiers is coupled to the alternating current power source input and the at least one direct current output bus, and a plurality of electrical cables for connecting to the at least one direct current output bus, where a total length of the plurality of electrical cables exceeds 800 feet.

In one example, the present disclosure also describes a method for deployment and/or use of a rectifier response unit that may include deploying a rectifier response unit to a site of a failure of at least one direct current power plant. The rectifier response unit may include a chassis, at least two wheels, an equipment enclosure, an alternating current power source input, and at least one direct current output bus. The rectifier response unit may further include a plurality of rectifiers having an output capacity exceeding 800 amperes, where the plurality of rectifiers is coupled to the alternating current power source input and the at least one direct current output bus, and a plurality of electrical cables, where a total length of the plurality of electrical cables is at least 800 feet. The method may additionally include coupling at least a first portion of the plurality of electrical cables to the at least one direct current output bus and to at least one battery bus of the at least one direct current power plant having a battery capacity in excess of 800 amperes, and coupling at least a second portion of the plurality of electrical cables to the at least one battery bus and to at least one return bus associated with the plurality of rectifiers.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
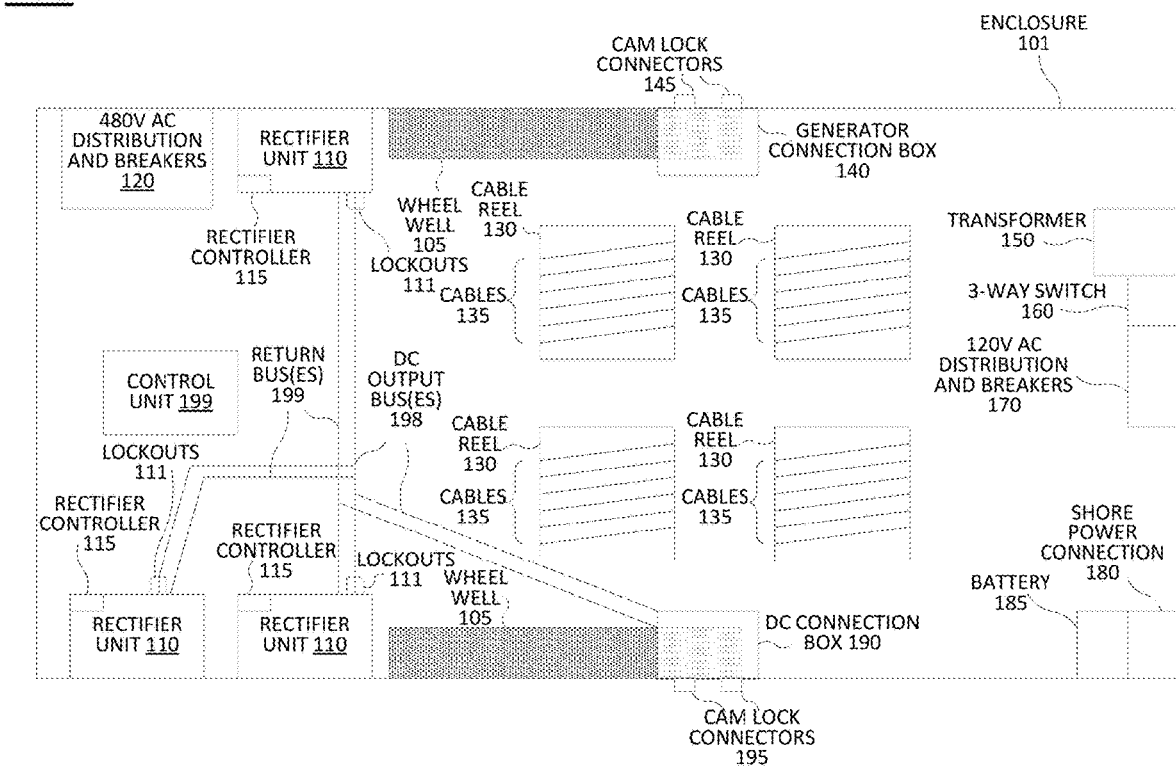
FIG. 1 illustrates an example rectifier response unit of the present disclosure.

The present disclosure describes example rectifier response units and methods for use and/or deployment of such rectifier response units, e.g., for communication network equipment, data centers, manufacturing sites, utilities, and so forth. To illustrate, well maintained DC power plants are important in maintaining communication network equipment operation and customer service. However, there are many situations that can compromise an AC power system driving a DC power plant that would make it unusable. In addition, both AC and DC power plants may be affected by flooding due to municipal pump failure or extreme weather events, or a catastrophic failure due to lightning strikes, fire, or the like. Under these conditions, the network elements will generally lose power and service may fail until the adverse conditions are cleaned up and the electrical components are inspected, repaired, and re-energized. Although the DC power plant may have a large battery array, should the rectifier(s) suffer a major failure for any reason, the time needed to bring in temporary or replacement equipment will generally exceed the battery reserve time of several hours. For instance, once the battery voltage drops below the minimum required level to support the network equipment, it may fail, potentially causing a large-volume loss of customer services. The time to restore a failed DC power plant may generally include the restoration of AC power, the repair or replacement of the rectifier equipment, and charging of the battery array, which could take from several hours to days or even months. Depending on market conditions, replacement equipment can have over a year lead time.

For any industry utilizing a battery plant/array (e.g., predominantly 48V DC) to provide backup power, the response to an event (e.g., an AC power source failure due to weather, equipment failure or vandalism, etc.) may generally proceed as follows. First, a service may fail while technicians work on resolving the issue that incapacitated the system. For instance, switchgear may need to be inspected and repaired along with the rectifier equipment. In one example, portable rectifier units may be deployed within the same space to temporarily replace damaged rectifiers. However, these "watt on wheels" (WoW) are large and cumbersome units, e.g., weighing over 600 lbs, and must be disassembled to move up or down stairs and then reassembled. These units may also require five AC cables and four DC cables to provide 400 amps of rectification. In addition, these units may be useable only after AC power is restored to a facility, and in some cases, after flooding or other hazards are remediated.

In contrast, examples of the present disclosure provide a rectifier response unit, e.g., a trailer or small truck, containing a plurality of rectifiers and electrical cables sufficient to deliver direct current in excess of 800 amperes (A) (e.g., at or around 48 V) over distances of at least 200 feet. In one example, the rectifier response unit may deliver up to 2,640 DC amps over distances of up to 250 feet or more. In one example, the trailer or truck is sized so that it can be towed/driven by local technicians without requirement for a commercial driver's license (CDL), e.g., less than 26,001 gross combine weight rating (GCWR). In one example, a portable generator unit (e.g., transported by another trailer or small truck) may be dispatched in conjunction with the rectifier response unit to provide an independent AC power source. For instance, the generator unit may be connected to the rectifiers in the rectifier response unit, and DC power from the rectifiers may be delivered via the electrical cables to the DC power plant that is being serviced. The generator unit may be capable of an output of at least 100 kilowatts or more (e.g., 150 kilowatts, 250 kilowatts, etc.). It should be noted that in one example, a generator may be included in the rectifier response unit. However, for ease of transport and flexibility of deployment, due to the size of generator units capable of supporting the DC power levels addressed by the present disclosure, the generator unit may be independent of the rectifier response unit.

In the event of equipment failure, the office AC power distribution and rectifiers can be safely locked and tagged out of service, and worked on independently while DC power from the rectifier response unit is provided directly to the battery bus. For instance, in the event of a DC power plant in a flooded office basement, this task can be performed with water levels as high as the battery post/bus. This may be three feet or more, since the power is provided to the battery bus, which is typically situated above the batteries. Notably, with water levels of this height, office AC power would likely be useless for multiple days, and cleanup and repair would take just as long. In one example, the number of cables used is also reduced as compared to the use of a portable rectifier cart (e.g., a WoW), for example. For instance, as noted above, these units may require five AC cables and four DC cables to provide 400 amps of rectification. To support 2,640 amps of power, six WOW units and 60 lengths of cable may be required. In contrast, a rectifier response unit of the present disclosure may operate with four short cables for AC and 16 cables for the same DC amperage. Since the only items being carried into a facility are the fewer cables, this makes the deployment a significantly quicker process, providing a greater chance of maintaining network power and service to customers.

In one example, the multiple rectifiers of the rectifier response unit enable DC power to be delivered to multiple plants at the same time, e.g., two DC power plants in different parts of a same office, or in two or more different buildings nearby. In one example, voltage adjustments can be made to compensate for voltage drop over the distance(s) of cable to the one or several DC power plants. Thus, communication network operators, utilities, and other industries operating in areas prone to flooding or vandalism may benefit from the use of a rectifier response unit in accordance with the present disclosure. In one example, the rectifier response unit may be equipped with environmental control units (e.g., heat pumps and/or air conditioners, or the like) to keep the equipment within the proper temperature range (e.g., three 15K BTU environmental control units). These attributes make this response unit with the ability to preserve service, rather than a restoration unit designed for use after customer service is lost. These and other aspects of the present disclosure are described in greater detail below in connection with the examples of FIGS. 1-5.

To aid in understanding the present disclosure, FIG. 1 illustrates an example layout/top view of a rectifier response unit 100 in accordance with the present disclosure. In the example of FIG. 1, the rectifier response unit 100 may comprise a trailer that may include an enclosure 101 (e.g., having a width of approximately 8.5 feet and length of approximately 20 feet) and wheel wells 105. The enclosure 101 may be supported by a chassis and there may be at least one axle with at least two wheels, a hitch, etc. As further illustrated in FIG. 1, the rectifier response unit 100 includes three rectifier units 110. In one example, each of the rectifier units comprises at least one rectifier. In one example, each of the rectifier units 110 may comprise a plurality of rectifiers, e.g., four rectifiers, etc. In one example, each of the rectifier units 110 may comprise a rack that includes a plurality of housing elements, where the rectifiers are contained within respective housing elements within the rack. In one example, the racks may be movable carts such that one or more of the rectifier units 110 may also be separated from the rectifier response unit 100 and used as a conventional portable rectifier unit/WoW. In one example, each of the rectifiers/rectifier units 110 may operate with 480V input and may provide a variable/adjustable output voltage a range around 48V (e.g., 40 V to 60V, or the like). In one example, each of the rectifiers may be rated at 12 KW and may provide a maximum output of approximately 220 A. Thus, in an example in which each rectifier unit 110 comprises four rectifiers, each of the rectifier units 110 may provide a maximum output of approximately 880 A (e.g., at or around 48V DC). As such, the entire rectifier response unit 100 may provide up to 2,640 A output. It should be noted that in other, further, and different examples, different numbers of rectifiers and/or rectifier units 110 may be included in the rectifier response unit 100, rectifiers and/or rectifier unit of different capacities may be used (e.g., 1000 A rectifier units, or the like), the rectifiers may be designed and/or capable of accepting an AC input of different voltage(s), and so forth.

As further illustrated in FIG. 1, the rectifier response unit 100 may include a generator connection box 140, which may be installed on the wall of the enclosure 101, and which may include cam lock connectors 145 providing for external electrical cable hookup. For instance, as mentioned above, a portable generator unit capable of output in excess of 100 kilowatts (e.g., 150 kilowatts, 250 kilowatts, or the like) may be dispatched in conjunction with a rectifier response unit, such as rectifier response unit 100. In one example, the generator unit may provide AC power at 480V and 400 A. The generator unit AC output(s) may be connected to the rectifier response unit via electrical cabling to the cam lock connectors 145 and the generator connection box 140. In one example, the generator connection box 140 is further connected to the rectifier units 110 via 480V AC distribution and breakers 120 (for ease of illustration, inter-unit wiring is omitted from FIG. 1). As such, 480V AC may be delivered to the rectifier units 110. As noted above, the rectifier units 110 may collectively provide up to 2,640 A output, e.g., at or around 48 VDC (e.g., between 40 to 60V DC). In one example, this output is delivered to one or more DC output buses 198. For instance, the rectifier response unit 100 may include a plurality of lockouts 111 for each of the rectifier units 110 which may be used to create a fully shared one of the one or more DC output buses 185, or which may isolate respective ones of the one or more DC output buses 185 (e.g., one bus per each of the rectifier units 110, or other combinations).

In this regard, the rectifier response unit 100 may include a DC connector box 190 that may comprise and/or which is coupled to the one or more DC output buses 198. In addition, the DC connector box 190 may have cam lock connectors 195 for coupling cables 135 (e.g., electrical cables) to the one or more DC output buses 198 and to one or more return buses 199 (e.g., ground) (and/for further connection to a DC power plant/battery bus and/or DC electrical equipment being service). In one example, there are at least four cam lock connectors 195. In one example, there are at least 16 cam lock connectors 195. As further illustrated in FIG. 1, the cables 135 may be stored on cable reels 130. In this case, there are four cable reels 130. In one example, each reel is capable of storing up to 900 feet of cable. As such, the rectifier response unit 100 may include up to 3600 feet of cable. In one example, the cable reels 130 may be motorized to assist in spooling and unspooling the cables 135 for use. In one example, the cables 135 may be 50 foot long section of 4 AWG insulated cable, which may be interconnected with each other and with the cam lock connectors 195 (and also with cam lock connectors 145). In one example, each section of the cables 135 is capable of carrying up to 400 A of current (e.g., at or around 48V DC). Thus, for example, to deliver 800 A to a DC power plant, there would be a minimum of four parallel cables runs used, e.g., two positive/source cable runs and two return/negative cable runs. Depending upon the distance of the rectifier response unit 100 from the DC power plant/battery bus, each cable run may include one, two, or more of the cables 135. For instance, for battery bus that is 240 feet away, each cable run may be 250 feet, or five 50 foot cables connected end-to-end.

In the example of FIG. 1, rectifier response unit 100 further includes a transformer 150, a three-way switch 160, and 120V AC distribution and breakers 170. (e.g., a 110/120V AC distribution). For instance, the rectifier response unit 100 may power various local AC components at 110/120V (e.g., lights, air conditioning/climate control units, fans, etc.) from the generator unit via these components. For example, the transformer 150 may be configured to receive 480V AC as input (e.g., at 60 A), and may output 120V AC (e.g., at 100 A). In one example, the transformer 150 may be sized depending upon the local component load (e.g., the requirements of climate control unit(s), motors of the reels 130, lights, etc.). For ease of illustration, these local components are omitted from FIG. 1. As further illustrated in FIG. 1, rectifier response unit 100 may also include a shore power connection 180. For instance, these local components may also be powered from an electric power grid, e.g., as an alternative or in addition to AC power from a generator unit. Thus, for example, the three-way switch 160 may select between generator power and shore power (e.g., 30 A, 50 A, or the like). It should be noted that in one example, rectifier response unit 100 may also include at least one battery 185. For example, this battery may include its own rectifier and may be used for powering local components of the rectifier response unit 100 when other sources are not available, such as turning the lights on to check equipment when the rectifier response unit 100 is not in service, and so forth.

In one example, the rectifier units 110 may each include a rectifier controller 115, e.g., each comprising a processing system including at least one processor, such as computing system 500 illustrated and described in connection with the example of FIG. 5. In one example, the rectifier controllers 115 may individually or collectively be configured to perform various operations in connection with the deployment and operation of the rectifier response unit 100. For instance, the rectifier controllers 115 may calculate one or more voltages for output via one or more of the rectifier units 110 (e.g., to compensate for voltage drop(s) over the distance(s) of cable to one or several DC power plants), may make voltage adjustments in the respective rectifier units 110 in response to changes in the load profile(s) of the DC plant(s) (e.g., as batteries may be charged from a low charge state to a high charge state), and so forth. Similarly, in one example, rectifier controllers 115 may calculate adjustments to output currents and may make such adjustments, e.g., in response to a change in a load, such as an addition or subtraction of electrical equipment within the DC power plant. For instance, if each rectifier is capable of outputting a maximum of 220 A and if 600 A is needed for a particular load, then three rectifiers may be activated at a particular one of the rectifier units 110, while a fourth may be deactivated (or may be left to remain in an unpowered state). Later the fourth rectifier may be activated by a respective one of the rectifier controllers 115, e.g., if the load increases, or an additional rectifier may be deactivated, e.g., if the load decreases. Alternatively, three rectifiers from three different rectifier units 110 may be used, with other rectifiers being placed in an inactive state.

In one example, the rectifier controllers 115 may be in communication with one another and may coordinate voltage and/or amperage changes collectively. In another example, rectifier response unit 100 may additionally include a control unit 199 which may coordinate among the rectifier controllers 115. In one example, the control unit 199 may include user input/output components to enable a user to select voltage(s), amperage(s), etc., which may be provided to rectifier controllers 115 as instructions, and so forth. In one example, the control unit 199 may also comprise a processing system including at least one processor, such as computing system 500 illustrated and described in connection with the example of FIG. 5. It should also be noted that the layout of the rectifier response unit 100 is provided by way of example, and may account for optimal weight distribution, ease of access to certain components, and/or a combination thereof. Thus, it should be appreciated that other layouts may be used in other variations, which may depend on the trailer and/or truck dimensions, floor weight distribution requirements, the number of rectifier units, the number of cables to be carried, and so forth. These and other aspects of the present disclosure are discussed in additional detail in connection with the examples of FIGS. 2-5.

Figure 2:
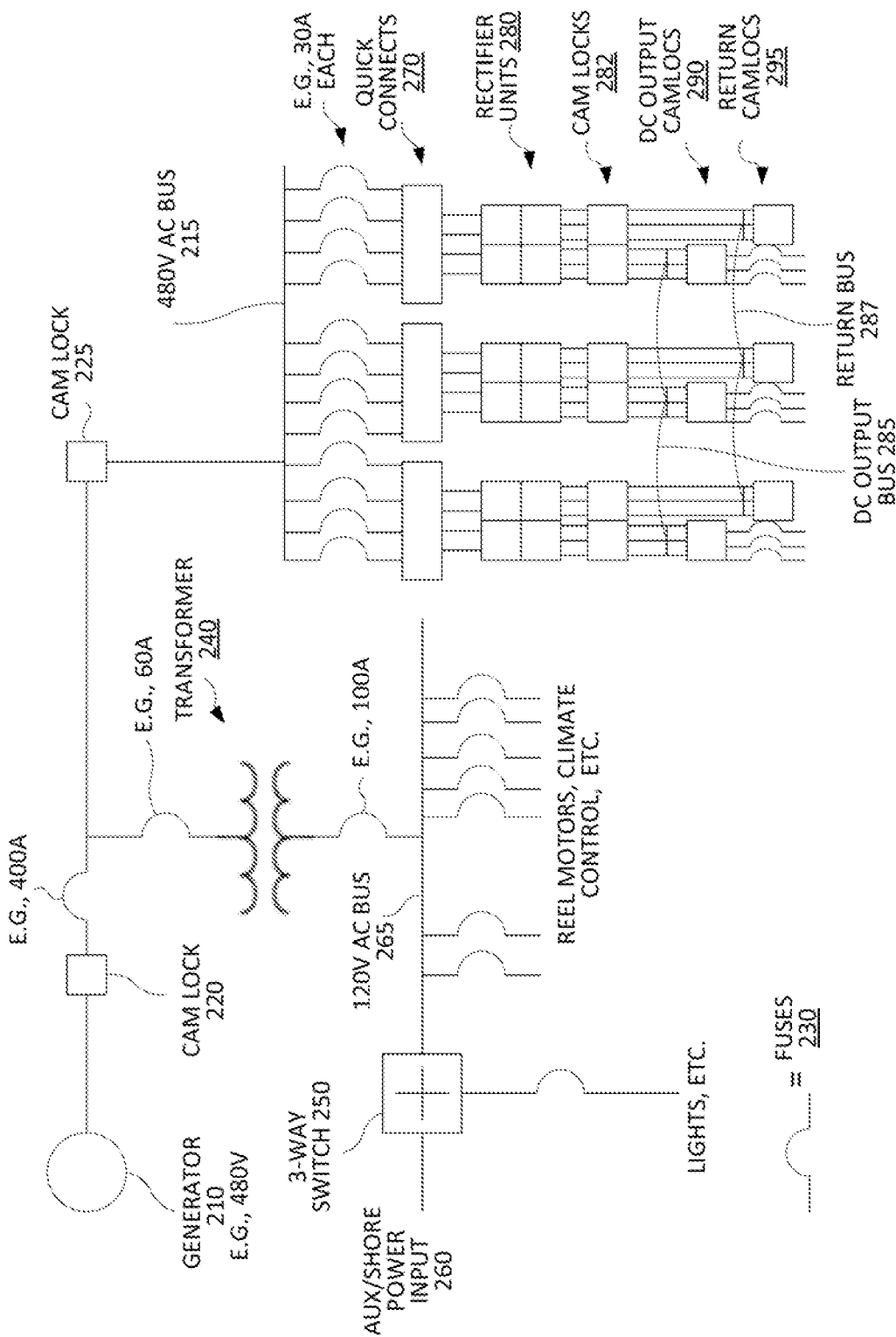
FIG. 2 illustrates a one-line diagram that includes DC connections, and which may be associated with at least a portion of an example rectifier response unit.

To further aid in understanding the present disclosure, FIG. 2 illustrates a one-line diagram 200 that includes DC connections, and which may be associated with at least a portion of the example rectifier response unit 100 of FIG. 1. It should be noted that the components of FIG. 2 may represent some of the same or similar components as illustrated in FIG. 1 and described above. For instance, FIG. 2 illustrates a generator 210 (e.g., a generator unit that provides an output of 480V). The generator 210 may connect to other components via cam lock 220 (e.g., a cam lock connector for connecting AC cable(s) on an external side of a rectifier response unit). A first breaker 230 may comprise a 400 A breaker, or the like that protects a 480V AC bus 215 and the components connected thereto. An additional cam lock 225 connects to the 408V AC bus 215 and the rectifier units 280. In one example, the 480V AC bus 215 powers the rectifier units 280 via a plurality of branches, each having a breaker (e.g., 30 A breakers) and respective quick connects 270. In the present example, each of the rectifier units 280 may include four rectifiers (and a respective rectifier controller (not shown)). In addition, the rectifier units 280 may each be coupled to the DC output bus 285 and the return bus 287, and may further be associated with cam locks 282 between the rectifier units 280 and the DC output bus 285 and return bus 287 (e.g., for disconnection of the rectifiers units 280). DC output cam locks 290 and return cam locks 295 are also provided, e.g., for cable connections on the external side of a rectifier response unit. The generator 210 may further drive a transformer 240 that is protected by respective breakers, e.g., a 60 A breaker and a 100 A breaker. The 120V AC bus 265 (e.g., a 110/120V bus) delivers AC power to components such as lights, reel motors, climate control, and so forth. In one example, three-way switch 250 may select which AC components (or set(s) of components) may receive AC power. In addition, 3-way switch may be set to select auxiliary/shore power input 260 (e.g., as an alternative or in addition to AC power from generator 210).

In one example, the DC output bus 285 may be segregated into two or more independent buses. For example, as noted above, a rectifier response unit may service two or more DC power plants independently. In addition, these separate plants may have different loads, e.g., different amperage requirements. In addition the separate plants may have different voltage requirements. For instance, one may be further away than another, which may involve compensating for voltage drops over different distances. Alternatively, or in addition, the loads may include charging of battery arrays in different states of charge, and which may have different charging profiles, which may thus call for different voltages to be use for the respective plants. In these examples, there may be switches/lockouts which can create a fully shared DC output bus 285, or which may isolate two or more buses (e.g., one bus per each rectifier unit 280, or other combinations, such as a first shared bus for the two left-most rectifier units 280 and a second bus for the right-most rectifier unit 280). In other words, different ones of the rectifier units 280 may be assigned to and may service different DC power plants. In addition, the rectifier units 280 may independently adjust output voltages and/or may adjust the output currents (and/or may be controlled/instructed by a control unit, such as control unit 199 of FIG. 1). For instance, if each rectifier is capable of outputting a maximum of 220 A and 600 A is needed to a particular load, then three rectifiers may be activated at a particular one of the rectifier units 280, while a fourth may be deactivated (or may be left to remain in an unpowered state).

Figure 3:
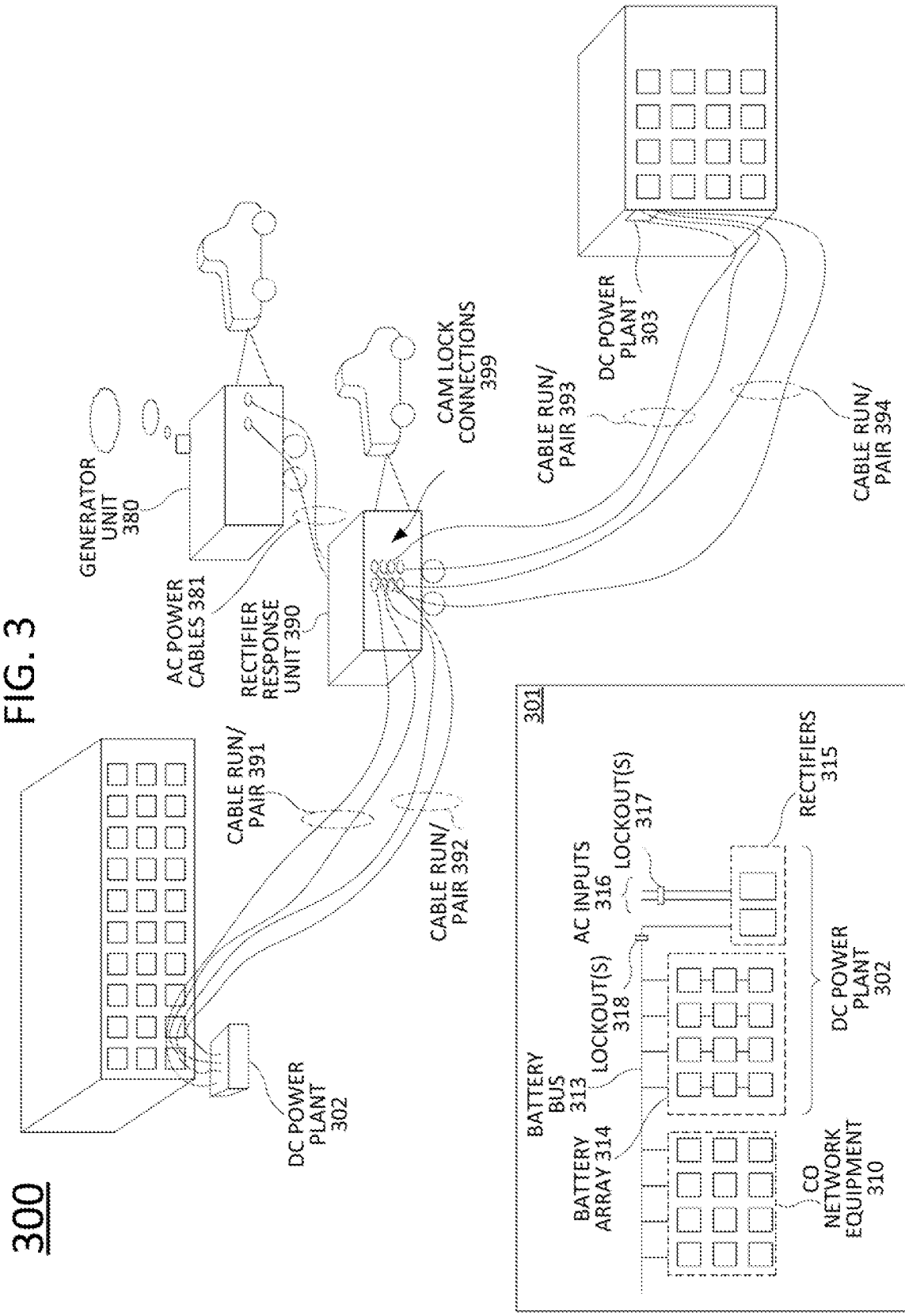
FIG. 3 illustrates an example incident, or scene, to which a rectifier response unit of the present disclosure may be dispatched.

To further aid in understanding the present disclosure, FIG. 3 illustrates an example incident 300, or scene, to which a rectifier response unit 390 may be dispatched. For instance, in this example, there may be two separate DC power plants 302 and 303 comprising central office (CO) network equipment in different buildings that may be affected by an outage, such as loss of AC power from the electric power grid, etc. In addition, it should be noted that DC power plant 302 may be located in a basement of a first building, while DC power plant 303 may be located in the fourth floor of a second building, thus illustrating the difficulty that may be faced when attempting to reach these locations with portable rectifier carts. Continuing with the present example, rectifier response unit 390, e.g., a trailer towed by a light truck, may be dispatched to the scene. In addition, it may be accompanied by a portable generator unit 380, which in the present example, may be similarly towed by a light truck. Accordingly, portable generator unit 380 may provide AC power to the rectifier response unit 390 via AC power cables 381.

For illustrative purposes, each of the DC power plants 302 and 330 may be designed for and operate with 700 A equipment load (and hence with corresponding battery arrays to match). For instance, inset 301 illustrates further details of the DC power plant 302 and corresponding central office (CO) network equipment 310, which may include rectifiers 315 fed by AC inputs 316 and having one or more lockouts 317. The rectifiers 315 may provide output DC power to the battery bus 313 for charging the batteries in battery array 314 and for driving the CO network equipment 310. The rectifiers 315 may be locked out from the battery bus 313 via one or more lockouts 318. Collectively, the rectifiers 315 and the battery array 314 may be referred to as a DC power plant (e.g., DC power plant 302). Although the illustration of FIG. 3 is representative in nature, it should be noted that in many cases, the rectifiers, such as rectifiers 315 may be located near the floor, while the battery bus, such as battery bus 313, may be over the top of a battery array (which may include multiple batteries stacked atop one another, and which may be 2-3 feet in height or more). It should also be noted that battery array 314 may have various configurations, such as series, parallel, or combinations thereof, such as four parallel columns of four batteries in series, etc. It should also be noted that DC power plant 303 may have a same or similar configuration as DC power plant 302.

Notably, there are two DC power plants 302 and 303 that are affected in by an incident in the example of FIG. 3. However, in accordance with the present disclosure, the rectifier response unit 390 may be equipped to handle both. For instance, as noted above, 4 AWG cables may be capable of delivering 400 A DC power. As such, to deliver 700 A to DC power plant 302, two cable run pairs 391 and 392 may be used. For instance, each cable run pair may include a positive/source cable run and an associated return/negative cable run, and may deliver up to or above 400 A DC (e.g., at or around 48V, e.g., 40-60V). As such, the two cable run pairs 391 and 392 may delivery 700 A (or more, e.g., up to 800 A or more (e.g., depending on the excess rating of the cables)). Similarly, cable run pairs 393 and 394 may each deliver 400 A to DC power plant 303, together providing up to 800 A total (or more). It should again be noted that the cable runs may comprise a plurality of cables connected end-to-end. For instance, if the distance from rectifier response unit 390 to the DC power plant 302 is 240 feet, and if the cables are 50 feet each, then each cable run in the cable run pairs 391 and 392 may have five cables and a total length of 250 feet. Similarly, if the distance from rectifier response unit 390 to the DC power plant 303 is 160 feet, then each cable run in the cable run pairs 393 and 394 may have four cables and a total length of 200 feet.

It should be noted that to delivery DC power to DC power plant 302, the AC inputs 316 and rectifiers 315 may be locked out by one or both of the lockout(s) 317 and/or 318, and the source/positive cable runs connected to battery bus 313 (with the negative/ground cable runs being connected to a negative/ground battery bus (not shown)). It should also be noted that although the battery bus 313 is labeled as such, the CO network equipment may be powered directly by the rectifier response unit 390 via the battery bus 313, e.g., without constraint with respect to the state of the batteries in battery array 314 (and similarly with respect to the DC power plant 303). In addition, as illustrated in FIG. 1, there are therefore at least eight cam lock connections 399 to enable this particular configuration. However, it should be noted that in one example, rectifier response unit 390 may comprise additional cam lock connectors, such as 16 to enable four cable run pairs to each of two DC power plants to enable delivery of 1600 A to each. It should be noted that in such case, the number of rectifier units/rectifiers and or the output capacity of such rectifier units/rectifiers may be such that the collective output may exceed 3200 A (e.g., four 880 A rectifier units, or the like). Thus, these and other variations are all contemplated within the scope of the present disclosure.

Figure 4:
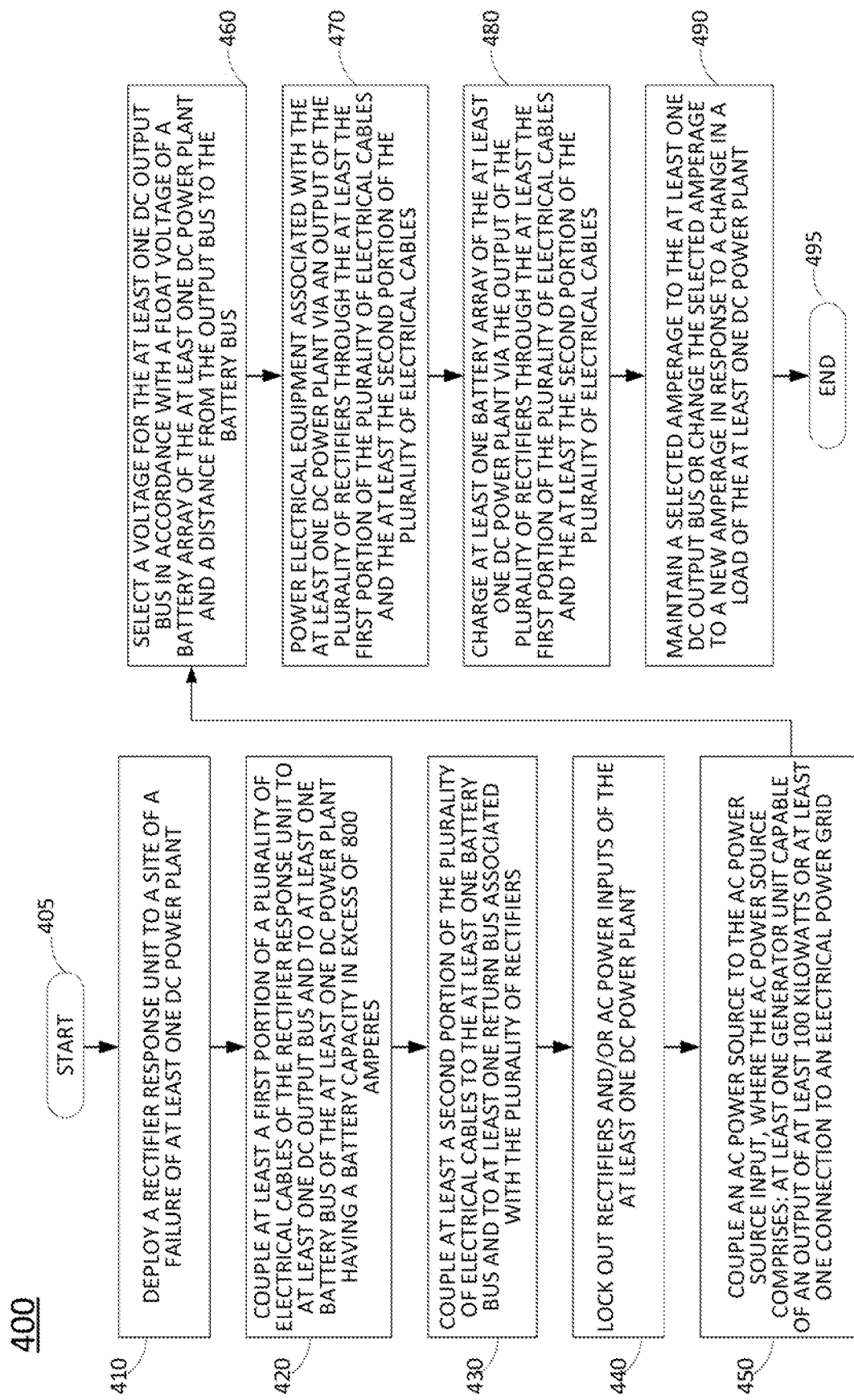
FIG. 4 illustrates a flowchart of an example method for use and/or deployment of a rectifier response unit, in accordance with the present disclosure.

FIG. 4 illustrates a flowchart of an example method 400 of use and/or deployment of a rectifier response unit, in accordance with the present disclosure. The method 400 begins in step 405 and proceeds to step 410.

At step 410, the rectifier response unit may be deployed to a site of a failure of at least one DC power plant. In accordance with the present disclosure the rectifier response unit may comprise a chassis, at least two wheels, and an equipment enclosure (e.g., a trailer and/or a truck, or the like). The rectifier response unit may also include an AC power source input, at least one DC output bus, and a plurality of rectifiers having an output capacity exceeding 800 amperes, where the plurality of rectifiers is coupled to the AC power source input and the at least one DC output bus. In addition, the rectifier response unit may include a plurality of electrical cables, where a total length of the plurality of electrical cables is at least 800 feet. In one example, the total length of the plurality of electrical cables may exceed 3500 feet. In one example, the plurality of rectifiers is capable of an output on the at least one DC output bus that exceeds 2500 amperes. In one example, the plurality of rectifiers is adjustable to provide a voltage on the at least one DC output bus within a range of 40 to 60 volts. In one example, the plurality of rectifiers may comprise a plurality of rectifier units, where each rectifier unit of the plurality of rectifier units comprises at least two of the plurality of rectifiers. In addition, in one example, each rectifier unit of the plurality of rectifier units may be capable of enabling and disabling each of the at least two of the plurality of rectifiers on a per-rectifier basis. In one example, the rectifier response unit may further include a plurality of reels for storing the plurality of electrical cables. In one example, the rectifier response unit may further comprise a generator unit, e.g., for connecting to the AC power source input, and where the generator unit is capable of an output of at least 100 kilowatts (e.g., 150 kilowatts, 250 kilowatts, etc.). In one example, the rectifier response unit may also include a plurality of connectors, for connecting at least a first portion of the plurality of electrical cables to the at least one DC output bus and for connecting at least a second portion of the plurality of electrical cables to at least one return bus associated with the plurality of rectifiers.

In one example the deployment may include delivering the rectifier response unit to the site of the failure. In one example, the deployment may also include deploying at least one generator unit to the site (e.g., delivering another trailer or truck to the site, where the rectifier response unit does not possess its own generator, or when the rectifier response unit has a generator that is not of sufficient capacity). The DC power plant failure may include a loss of an AC power source for the at least one DC power plant (e.g., from the electric power grid, which may be widespread, or which may be localized to a building containing the DC power plant, or the like), a theft or failure of one or more power plant components of the at least one DC power plant, battery damage to one or more batteries of the at least one DC power plant, and so forth.

At step 420, the method 400 may include coupling at least a first portion of the plurality of electrical cables to the at least one DC output bus and to at least one battery bus of the at least one DC power plant having a battery capacity in excess of 800 amperes, e.g., 800 amperes expected or designed capacity (in other words, an array of fifty 20 amp batteries that are fully or partially drained or damaged, may still be considered an array having a 1000 amp capacity).

At step 430, the method 400 may include coupling at least a second portion of the plurality of electrical cables to the at least one battery bus and to at least one return bus associated with the plurality of rectifiers. In one example, the at least the first portion may comprise at least a first electrical cable and at least a second electrical cable. Similarly, in one example, the at least the second portion may comprise at least a third electrical cable and at least a fourth electrical cable. In one example, the at least one DC output bus may comprise at least a first DC output bus and at least a second DC output bus. In addition, the at least one DC power plant may comprise at least a first DC power plant and at least a second DC power plant. As such, the at least one battery bus may comprise at least a first battery bus of the at least the first DC power plant and at least a second battery bus of the at least the second DC power plant. In such case, the coupling of steps 420 and 430 may include: (1) coupling the at least the first electrical cable to the at least the first DC output bus and to the first battery bus of the at least the first DC power plant, (2) coupling the at least the third electrical cable to the first battery bus of the at least the first DC power plant and to at least one return bus associated with the plurality of rectifiers, (3) coupling the at least the second electrical cable to the at least the second DC output bus and to the second battery bus of the at least the second DC power plant, and (4) coupling the at least the fourth electrical cable to the second battery bus of the at least the second DC power plant and to the at least one return bus associated with the plurality of rectifiers. For instance, the foregoing configuration may be used to power at least two DC power plants, such as illustrated and described in connection with the example(s) of FIG. 3.

At step 440, the method 400 may include locking out rectifiers and/or AC power inputs of the at least one DC power plant. For instance, example lockouts 317 and 318 are illustrated in FIG. 3 and discussed above.

At step 450, the method 400 may include coupling an AC power source to the AC power source input, where the AC power source comprises: at least one generator unit capable of an output of at least 100 kilowatts or at least one connection to an electrical power grid, wherein the at least one connection to the electrical power grid is capable of providing AC in excess of 400 amperes.

At step 460, the method 400 may include selecting a voltage for the at least one DC output bus in accordance with a float voltage of a battery array of the at least one DC power plant and a distance from the DC output bus to the battery bus (e.g., a distance of the one or more cable runs).

At step 470, the method 400 may include powering electrical equipment associated with the at least one DC power plant via an output of the plurality of rectifiers through the at least the first portion of the plurality of electrical cables and the at least the second portion of the plurality of electrical cables.

At step 480, the method 400 may alternatively or additionally include charging at least one battery array of the at least one DC power plant via the output of the plurality of rectifiers through the at least the first portion of the plurality of electrical cables and the at least the second portion of the plurality of electrical cables. For instance, with respect to steps 470 and/or 480, after connecting the AC power source at step 450 (and locking out damaged rectifiers and AC power circuits in the at least one DC power plant, etc.), one or more switches may be toggled to deliver AC power to the rectifiers and to enable a DC output to flow via the DC output bus.

At step 490, the method 400 may include maintaining a selected amperage to the at least one DC output bus or changing the selected amperage to a new amperage by enabling or disabling at least one rectifier (e.g., of at least one of the plurality of rectifier units) in response to a change in a load of the at least one DC power plant. For instance, the change in the load may comprise addition or removal of electrical equipment. Alternatively, or in addition, step 490 may including reducing the voltage on the DC output bus if a battery is taken out of service, may include increasing the voltage if one or more batteries are put back in service, and so forth. In one example, the operations of step 490 may be performed by one or more rectifier controllers automatically.

Following step 490, the method 400 may proceed to step 495 where the method 400 ends.

It should be noted that the method 400 may be expanded to include additional steps, or may be modified to replace steps with different steps, to combine steps, to omit steps (e.g., any one or more steps may comprise optional steps), to perform steps in a different order, and so forth. For instance, the AC power source (e.g., a generator unit) may be connected before the electrical cables between the DC output bus and the DC power plant (however, in one example, without activating the AC power source until the electrical cables to the DC power plant are in place). In one example, the method 400 may be expanded or modified to include steps, functions, and/or operations, or other features described above in connection with the example(s) of FIG. 1-3, or as described elsewhere herein. Thus, these and other modifications are all contemplated within the scope of the present disclosure.

Figure 5:
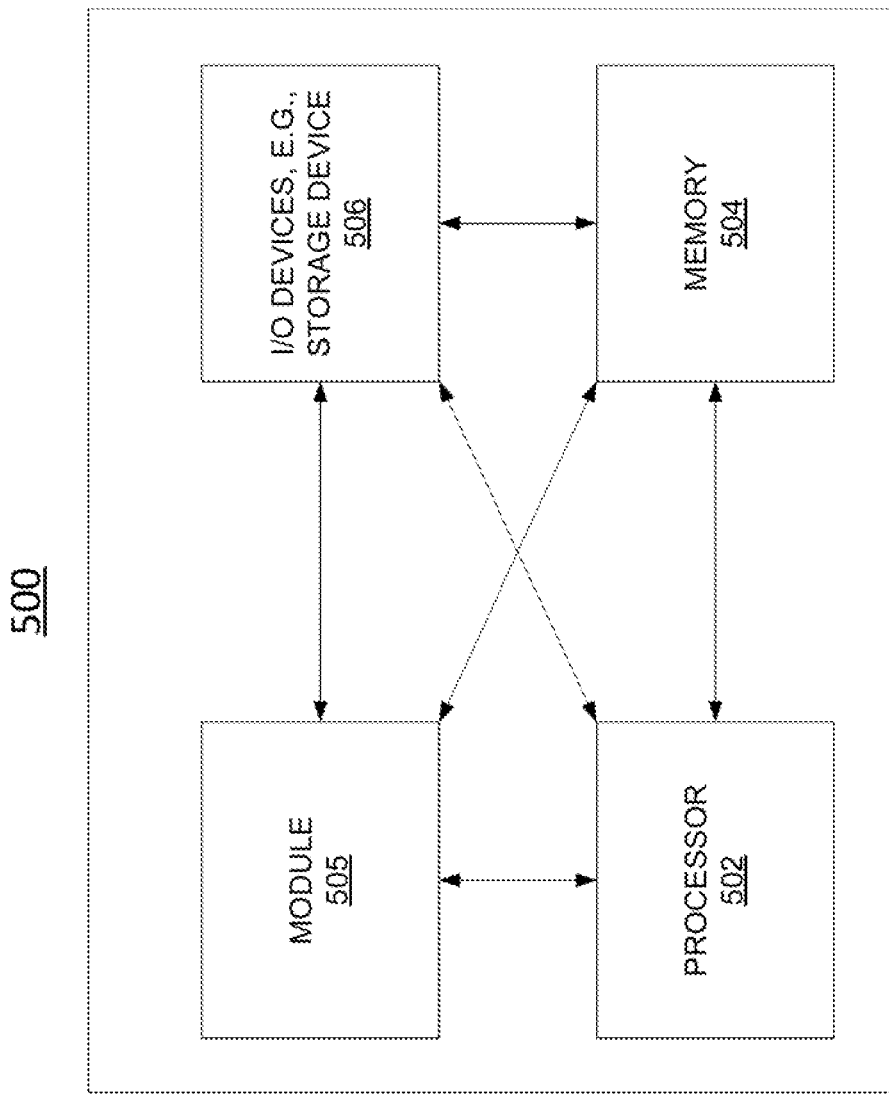
FIG. 5 illustrates a high level block diagram of a computing device specifically programmed to perform various steps, functions, blocks and/or operations as described herein.

FIG. 5 depicts a high-level block diagram of a computing system 500 (e.g., a computing device, or processing system) specifically programmed to perform one or more functions described herein. For example, one or more components or devices illustrated in FIG. 1 (such as control unit 199 or a rectifier controller 115) or discussed in connection with the examples of FIGS. 2-4 may be implemented as the computing system 500. As depicted in FIG. 5, the computing system 500 comprises a hardware processor element 502 (e.g., comprising one or more hardware processors, which may include one or more microprocessor(s), one or more central processing units (CPUs), and/or the like, where hardware processor element may also represent one example of a "processing system" as referred to herein), a memory 504, (e.g., random access memory (RAM), read only memory (ROM), a disk drive, an optical drive, a magnetic drive, and/or a Universal Serial Bus (USB) drive), a module 505 for performing one or more control actions associated with a rectifier response unit, and various input/output devices 506, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one hardware processor element 502 is shown, it should be noted that the computing device may employ a plurality of hardware processor elements. Furthermore, although only one computing device is shown in FIG. 5, if the method(s) and/other functions as discussed above is/are implemented in a distributed or parallel manner for a particular illustrative example, i.e., the steps of the above method(s) or the entire method(s) and/or other functions described above are implemented across multiple or parallel computing devices, e.g., a processing system, then the computing device of FIG. 5 is intended to represent each of those multiple computing devices. The hardware processor element 502 can also be configured or programmed to cause other devices to perform one or more operations as discussed above. In other words, the hardware processor element 502 may serve the function of a central controller directing other devices to perform the one or more functions/operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer readable instructions pertaining to the method(s) and/or other functions discussed above can be used to configure a hardware processor to perform the steps, functions, and/or operations of the above disclosed method(s) and/or other functions. In one example, instructions and data for the present module or process 505 for performing one or more control actions associated with a rectifier response unit (e.g., a software program comprising computer-executable instructions) can be loaded into memory 504 and executed by hardware processor element 502 to implement the steps, functions or operations as discussed above in connection with the example method(s), or as described elsewhere herein. Furthermore, when a hardware processor executes instructions to perform "operations," this could include the hardware processor performing the operations directly and/or facilitating, directing, or cooperating with another hardware device or component (e.g., a co-processor and the like, multiple rectifier controllers, etc.) to perform the operations.

The processor executing the computer readable or software instructions relating to the above described method(s) can be perceived as a programmed processor or a specialized processor. As such, the present module 505 for performing one or more control actions associated with a rectifier response unit (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or a server.

While various embodiments have been described above, it should be understood that they have been presented by way of example only, and not limitation. Thus, the breadth and scope of a preferred embodiment should not be limited by any of the above-described example embodiments, but should be defined only in accordance with the following claims and their equivalents.

What is claimed is:

1. An apparatus comprising:
   a chassis;
   at least two wheels; and
   an equipment enclosure comprising:

an alternating current power source input;

a plurality of direct current output buses;

a plurality of rectifier units, wherein each of the plurality of rectifier units comprises a plurality of rectifiers, wherein each rectifier of the plurality of rectifiers has an output capacity exceeding 800 amperes, and wherein each rectifier unit of the plurality of rectifier units is coupled to the alternating current power source input and to the plurality of direct current output buses;

a plurality of lockouts, wherein the plurality of lockouts includes a respective lockout for each pair of a rectifier unit of the plurality of rectifier units and a direct current output bus of the plurality of direct current output buses, and wherein the plurality of lockouts is configurable to select between: establishing an electrical connection from at least two of the plurality of rectifier units to a same direct current output bus of the plurality of direct current output buses and establishing respective electrical connections from respective rectifier units of the plurality of rectifier units to different direct current output buses of the plurality of direct current output buses; and a plurality of electrical cables for connecting to the plurality of direct current output buses at an exterior of the equipment enclosure, wherein a total length of the plurality of electrical cables exceeds 800 feet.

2. The apparatus of claim 1, wherein the total length of the plurality of electrical cables exceeds 3500 feet.

3. The apparatus of claim 1, wherein the plurality of rectifiers is capable of an output on at least one of the direct current output buses that exceeds 2500 amperes.

4. The apparatus of claim 1, wherein the plurality of rectifiers is adjustable to provide a voltage on at least one of the plurality of direct current output buses within a range of 40 to 60 volts.

5. The apparatus of claim 1, wherein each respective rectifier unit of the plurality of rectifier units is capable of enabling and disabling each of the plurality of rectifiers of the respective rectifier unit on a per-rectifier basis.

6. The apparatus of claim 1, further comprising:

a plurality of reels for storing the plurality of electrical cables.

7. The apparatus of claim 1, wherein the apparatus comprises one of:

a trailer; or a truck.

8. The apparatus of claim 1, further comprising:

a generator unit, for connecting to the alternating current power source input, wherein the generator unit is capable of an output of at least 100 kilowatts.

9. The apparatus of claim 1, further comprising:

a plurality of connectors, for connecting at least a first portion of the plurality of electrical cables to the plurality of direct current output buses at the exterior of the equipment enclosure and for connecting at least a second portion of the plurality of electrical cables to a plurality of return buses at the exterior of the equipment enclosure.

* * * * *